(12) United States Patent
Hoffmann et al.

(10) Patent No.: US 7,278,282 B2
(45) Date of Patent: Oct. 9, 2007

(54) DEVICE FOR TRANSFERRING HOLLOW GLASS OBJECTS FROM A GLASS-FORMING MACHINE ONTO A CONVEYOR BELT

(75) Inventors: Michael Hoffmann, Meerbeck (DE); Siegfried Schwarzer, Stöckse (DE); Dirk Winkelhake, Nienstädt (DE); Hermann Bögert, Auetal (DE)

(73) Assignee: Heye International GmbH, Obernkirchen (DE)

( * ) Notice: Subject to any disclaimer, the term of this patent is extended or adjusted under 35 U.S.C. 154(b) by 449 days.

(21) Appl. No.: 11/074,225

(22) Filed: Mar. 7, 2005

(65) Prior Publication Data

US 2005/0199011 A1    Sep. 15, 2005

(30) Foreign Application Priority Data

Mar. 12, 2004    (DE) ................. 20 2004 003 892 U

(51) Int. Cl.
*C03B 9/453*    (2006.01)

(52) U.S. Cl. ....................................... 65/260

(58) Field of Classification Search ................. 65/260, 65/235, 239, 237, 241, 165
See application file for complete search history.

(56) References Cited

U.S. PATENT DOCUMENTS

| | | | | |
|---|---|---|---|---|
| 3,595,365 A | * | 7/1971 | Faure | ................ 198/468.01 |
| 4,203,752 A | * | 5/1980 | Becker et al. | ............. 65/163 |
| 4,340,413 A | * | 7/1982 | Rowland | ................ 65/375 |
| 4,494,973 A | * | 1/1985 | Perry | ..................... 65/260 |
| 4,562,753 A | | 1/1986 | Kingsbury et al. | ........ 74/838 |
| 4,613,353 A | | 9/1986 | Voisine | ................... 65/163 |
| 5,037,466 A | * | 8/1991 | Voisine et al. | ............. 65/260 |
| 5,061,309 A | * | 10/1991 | Mungovan et al. | ......... 65/260 |
| 5,429,651 A | * | 7/1995 | Bolin | .................... 65/241 |
| 6,349,571 B1 | * | 2/2002 | Gorski et al. | ............. 65/260 |
| 6,494,063 B1 | * | 12/2002 | Malek | ..................... 65/260 |
| 6,702,097 B1 | * | 3/2004 | Leidy et al. | .......... 198/468.01 |

FOREIGN PATENT DOCUMENTS

| | | |
|---|---|---|
| CS | 288 848 | 6/1998 |
| DE | 3 421 053 C2 | 10/1986 |
| DE | 198 00 080 C1 | 3/1999 |
| EP | 0 037 799 | 10/1981 |
| EP | 1 319 633 A2 | 6/2003 |
| WO | WO 2005/085145 | * 9/2005 |

* cited by examiner

*Primary Examiner*—Steven P. Griffin
*Assistant Examiner*—DeMaris R. Wilson
(74) *Attorney, Agent, or Firm*—Synnestvedt & Lechner LLP

(57) ABSTRACT

A device for transferring an object from a dead plate of an Individual Section glass-forming machine to a conveyor belt is disclosed. The device includes a first shaft rotatable about an axis. A housing is attached to the first shaft. A carrying arm is slidably mounted on the housing and has a finger at one end for engaging the object. A guide piece having a groove is attached to the other end of the carrying arm. A crank arm engages the groove. The crank arm is connected to a second shaft coaxial with the first shaft. The shafts rotate independently of one another. Each shaft has its own drive unit. Rotation of the first shaft rotates the carrying arm about the first axis and rotation of the second shaft causes sliding motion of the carrying arm along its longitudinal axis.

23 Claims, 3 Drawing Sheets

DEVICE FOR TRANSFERRING HOLLOW GLASS OBJECTS FROM A GLASS-FORMING MACHINE ONTO A CONVEYOR BELT

FIELD OF THE INVENTION

The invention relates to a device for transferring at least one hollow glass object from a dead plate of each section of an I.S. (Individual Section) glass forming machine on to a conveyor belt which is common to all sections.

BACKGROUND OF THE INVENTION

In the case of a known device of this type (CZ 288 848 B6), a first drive unit enables the transfer device to pivot in a reciprocating manner. Furthermore, a second drive unit is provided, the driven shaft of which rotates constantly in the same direction and by means of a pair of cranks in the shape of a parallelogram enables the transfer device to move radially in a reciprocating manner into and out of contact with the hollow glass objects. This device is costly to construct. The device for moving the transfer device horizontally in a linear reciprocating manner requires a large volume of space and has an unfavourably large mass which is to be periodically accelerated and decelerated.

SUMMARY OF THE INVENTION

The object of the invention is to simplify the device and to make operation thereof safer.

This object is achieved by a transfer device having a pushing finger for each glass object to be transferred. The device which enables the transfer device to move horizontally in a linear reciprocating manner requires a small volume of space, is stable and can be actuated in a sensitive manner by virtue of the associated second drive unit.

The features of the device according to the invention are structurally particularly simple. They include a first shaft rotatable by a first drive unit, a housing mounted on the first shaft and a carrying bar mounted on the housing. The carrying bar is mounted on the housing and a finger for engaging the object to be transferred is mounted on the carrying bar. A guide piece is mounted on an opposite end of the carrying bar from the finger. The guide piece has a groove therein. A second shaft is mounted coaxially with the first shaft. The first and second shafts rotate independently of one another. A second drive unit rotates the second shaft. A crank arm is attached to the second shaft. The crank arm also slidingly engages the groove of the guide piece. Rotation of the second shaft effects reciprocal motion of the carrying bar along its longitudinal axis, and rotation of the first shaft effects rotation of the carrying bar about the first axis.

The guide piece is guided in an extremely precise manner during its linear movement through the use of two guide rods arranged in spaced disposition and in parallel with one another.

It is also possible, if required, to install two mutually parallel carrying bars.

The features of the invention ensure that the at least one carrying bar is guided in a precise manner during its linear movement.

Electro-servo motors are used to rotate the shafts. The electro-servo motors render it possible for the transfer device to pivot and to move in a linear direction in an extremely precise and reproducible manner.

Toothed belt gear mechanisms couple the servo motors with the shafts. The toothed belt gear mechanisms tried-and-tested structural components and render it possible for the turning moment to be transmitted in a slip-free manner.

By attaching the drive units to a component that is adjustably mounted on the device, the toothed belt may be tensioned in a convenient manner.

BRIEF DESCRIPTION OF THE DRAWINGS

These and further features and advantages of the invention are further described hereinunder with reference to the exemplified embodiment illustrated in the drawings, in which.

DETAILED DESCRIPTION OF THE EMBODIMENTS

Figure 1:
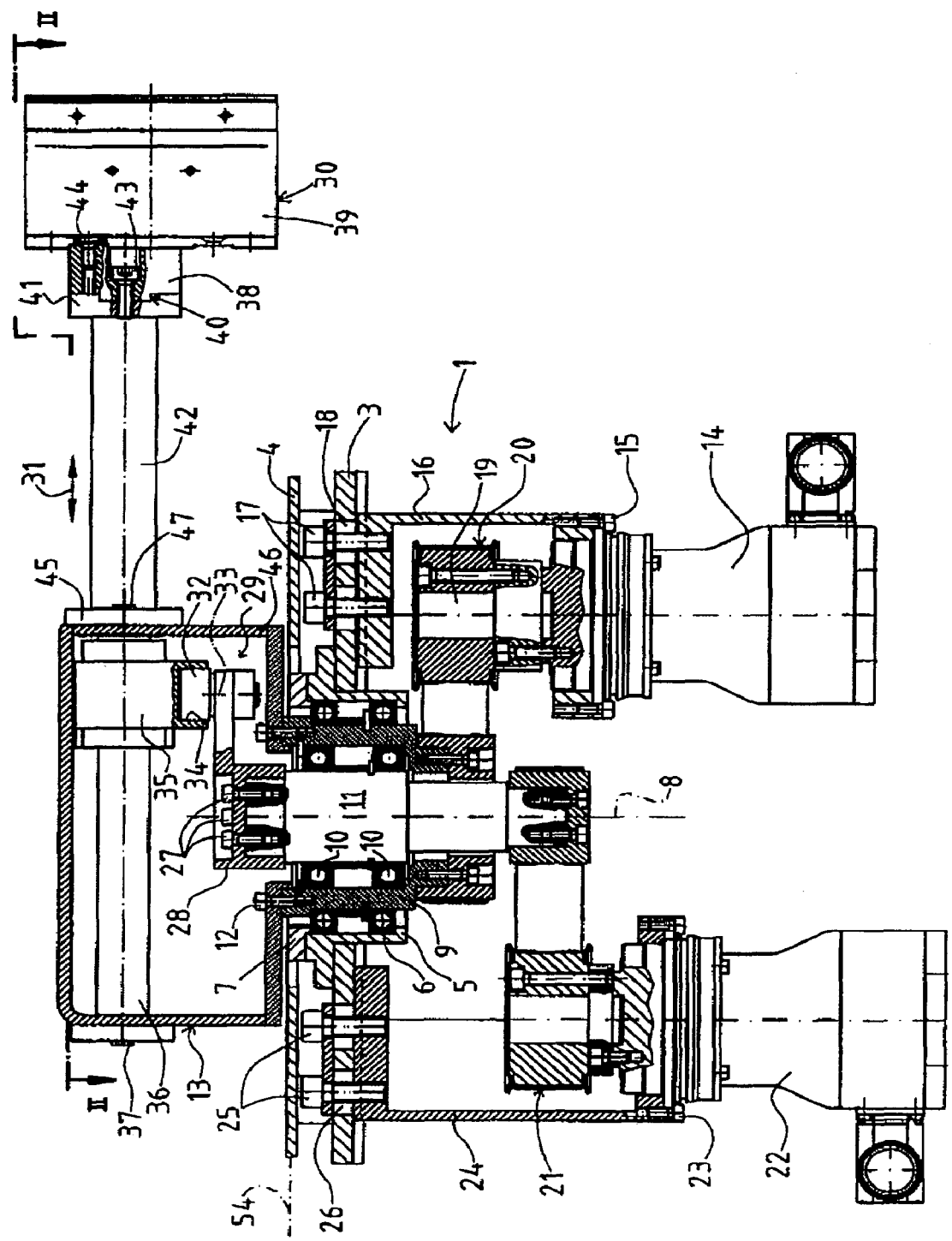
FIG. 1 is a longitudinal sectional view through a device.

FIG. 1 illustrates a device 1 for transferring hollow glass objects 2 (FIG. 2) from a dead plate (not illustrated) of a section of an I.S. (individual section) glass-forming machine on to a conveyor belt which is common for all sections. Such devices are known per se, and therefore, a detailed description of their structural details is not required here.

The device 1 comprises in accordance with FIG. 1 a plate-shaped component 3 which is fixedly mounted on the machine. Above the component 3 is disposed a cover plate 4 which is screwed to the component 3. A bearing bush 5 is inserted into a central bore of the component 3 and screwed to the component 3 by means of screws (not illustrated). Two roller bearings 6 are inserted into the bearing bush 5 and secured at the top by means of a cover ring 7. The cover ring 7 is fixed to the bearing bush 5 by means of screws (not illustrated).

A hollow shaft 9 which can pivot about a vertical first longitudinal axis 8 is mounted in the two roller bearings 6. In the hollow shaft 9, there is mounted by way of two roller bearings 10 a shaft 11 which can rotate about the first longitudinal axis 8.

A housing 13 which is disposed above the cover plate 4 is attached at the top to the hollow shaft 9 by means of screws 12.

A first drive unit 14 is attached by means of screws 15 at the bottom to a first holding device 16. The first holding device 16 is drawn by means of screws 17 against a lower side of the component 3. Each screw 17 penetrates an elongated hole 18 of the component 3 which extends in the direction of the first longitudinal axis 8. A driven shaft 19 of the first drive unit 14 is connected to the hollow shaft 9 by a first gear mechanism 20 which is in the form of a toothed belt gear mechanism.

The shaft 11 can be rotatably driven by a second drive unit 22 via a second gear mechanism 21 which is in the form of a toothed belt gear mechanism. The second drive unit 22 is attached by means of screws 23 at the bottom to a second holding device 24. The second holding device 24 is in turn fixed by means of screws 25 and associated elongated holes 26 in the component 3 in such a manner as to be adjustable relative to the first longitudinal axis 8.

If in the case of each of the drive units 14 or 22 the tension in the toothed belt of the associated gear mechanism 20 or 21 is to be adjusted, the associated screws 17 or 25 are slackened and the associated holding device 16 or 24 displaced radially outwards with respect to the first longitudinal axis 8, until the desired belt tension is achieved. The screws 17 or 25 are then retightened.

A crank 28 of a device 29 is screwed to an upper end of the shaft 11 by means of screws 27. The device 29 is disposed substantially inside the housing 13 and serves to enable a transfer device 30 to move horizontally in a linear reciprocating manner in the directions of a double arrow 31. At a free end of the crank 28 is mounted a freely rotatable roller 32 with a perpendicular second longitudinal axis 33. The roller 32 engages with a slide-fit into a groove 34, which extends transversely to the directions 31 of the reciprocating movement of the transfer device 30, in a guide piece 35 of the device 29. The guide piece 35 can be displaced in the directions 31 of the reciprocating movement of the transfer device 30 on two guide rods 36 which are disposed at a mutually spaced disposition and in a mutually parallel manner. The guide rods 36 are fixed by means of screws 37 to the housing 13 (cf. also FIG. 2).

Figure 2:
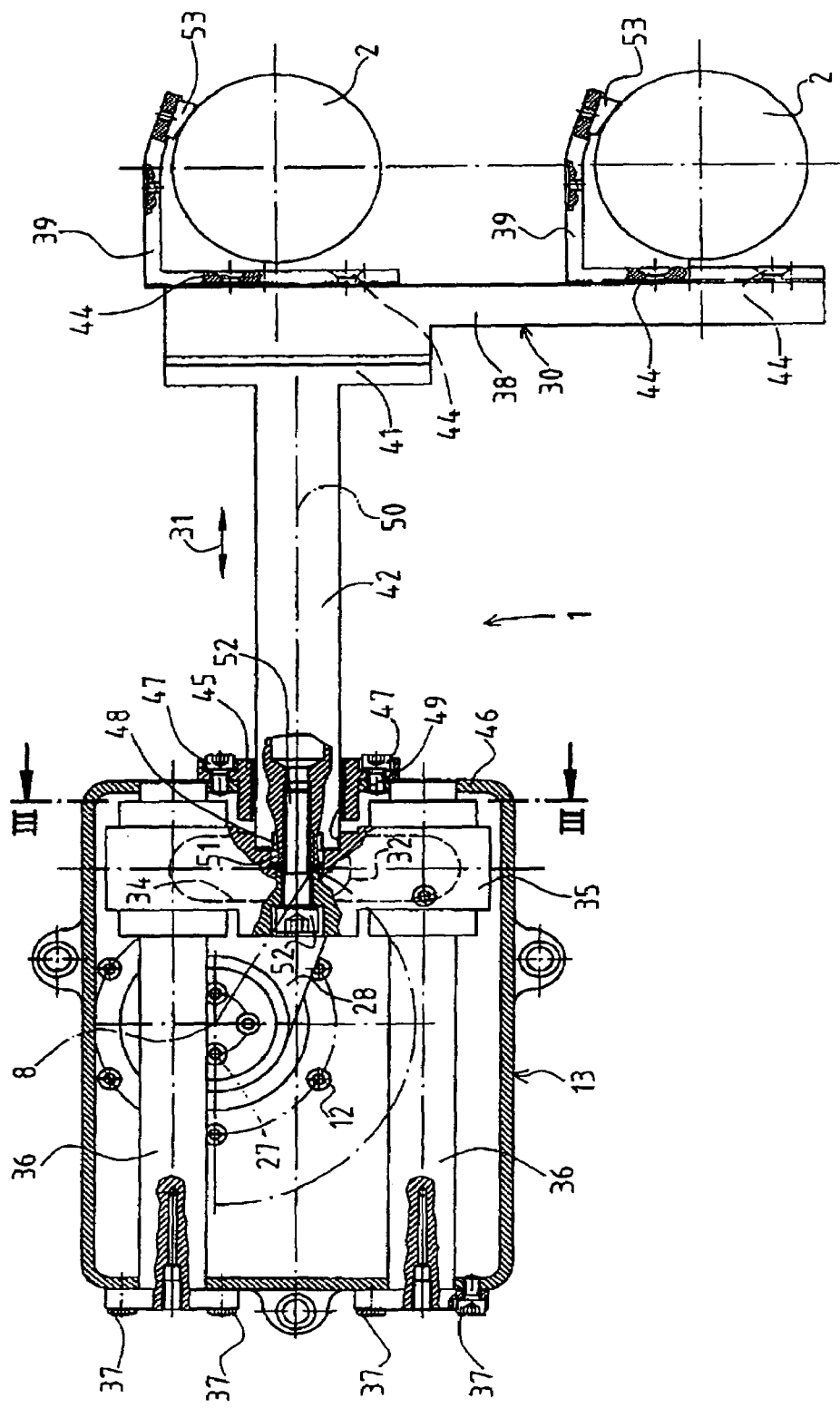
FIG. 2 is essentially the partially sectioned view along the line II-II in FIG. 1.

FIGS. 1 and 2 both clearly show that the transfer device 30 comprises a base component 38 and for each hollow glass object 2 which is to be transferred a pushing finger 39 which extends in a transverse manner from the base component 38. The base component 38 is connected via a tongue and groove connection 40 in a positive-locking manner to a connection plate 41 of a carrying bar 42. This connection is secured by means of screws 43. Each pushing finger 39 is attached by means of screws 44 in a releasable manner to the base component 38.

The carrying bar has a circular periphery and slides in the directions 31 in a bearing bush 45 which is inserted into a bore in a side wall 46 of the housing 13 and is held there by means of screws 47.

At its left end in FIGS. 1 and 2, the carrying bar 42 is provided with two diametrically opposite surfaces 48. The carrying bar 42 engages with its end and the surfaces 48 into a recess 49 formed in a complementary manner in the guide piece 35. Consequently, the carrying bar 42 is prevented in a positive-locking manner from rotating about its longitudinal axis 50 relative to the guide piece 35. The left end of the carrying bar 42 is also provided with a centering spigot 51 which has a smaller diameter than the carrying bar 42. The centering spigot 51 engages in a complementary centering bore of the guide piece 35 and supports perfect positioning of the carrying bar 42 relative to the guide piece 35. The carrying bar 42 is drawn by means of a central screw 52 axially into its seat in the guide piece 35.

A dot-dash line in FIG. 1 illustrates an upper edge 54 of the conveyor belt.

Figure 3:
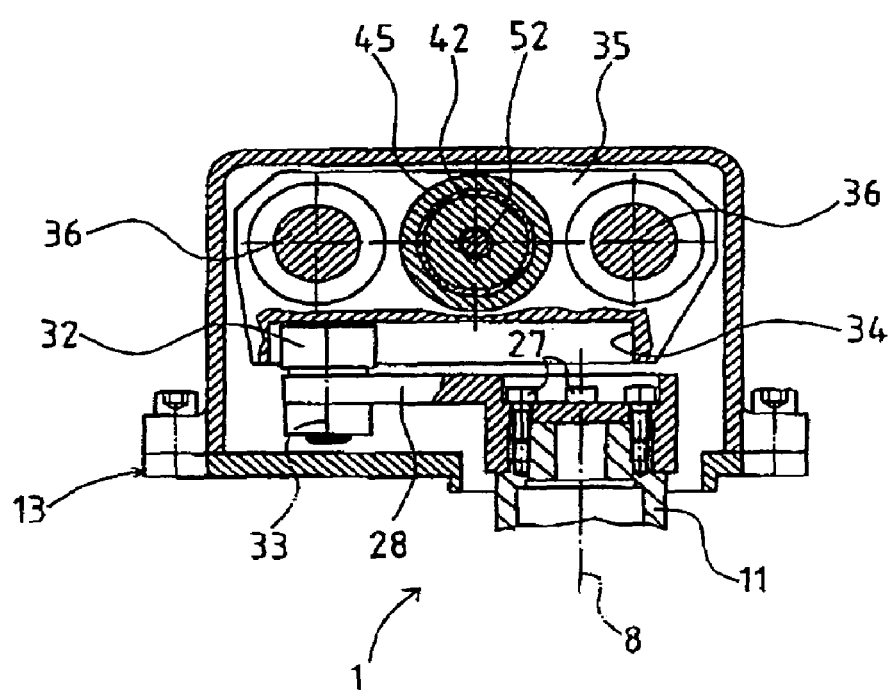
FIG. 3 is essentially the cross-sectional view along the line III-III in FIG. 2.

FIG. 3 illustrates further details of the device 1 in the cross-section.

The function of device 1 is as follows:

In a starting position, the hollow glass objects 2 which have just been produced in the associated section of the I.S. glass-forming machine are positioned on the dead plate (not illustrated in FIG. 2). The transfer device 30 is not in contact with the hollow glass objects 2 and is shown further left than in FIG. 2. The transfer cycle commences when the transfer device 30 is pushed out of its starting position into a working position in which the pushing fingers 39 are disposed in each case behind one of the hollow glass objects 2. The device 1 is then pivoted about the first longitudinal axis 8. In so doing, the free ends 53 of the pushing fingers 39 quickly come into contact with the hollow glass objects 2. Following this, the hollow glass objects 2 are transferred by means of the pushing fingers 39 normally at least along a quarter circle from the dead plate to the conveyor belt (not illustrated in FIG. 2). Subsequently, the transfer device 30 is drawn back into its previously mentioned starting position, wherein the pushing fingers 39 are removed from the hollow glass objects 2. The device 1 is finally pivoted back around the first longitudinal axis 8 into its starting position illustrated in FIG. 2.

The invention claimed is:

1. A device for transferring an object from a dead plate to a conveyor, said device comprising:
   a first shaft positionable adjacent to said conveyor, said shaft being rotatable about a first axis perpendicular thereto;
   a first drive unit coupled to said first shaft for effecting rotation thereof;
   a housing mounted on said first shaft;
   a carrying bar mounted on said housing, said carrying bar having a longitudinal axis oriented perpendicular to said first axis, said carrying bar being reciprocably movable along said longitudinal axis relative to said housing;
   a finger for engaging said object, said finger being mounted on one end of said carrying bar;
   a guide piece mounted on an opposite end of said carrying bar, said guide piece having a groove oriented transversely to said longitudinal axis;
   a second shaft mounted coaxially within said first shaft, said second shaft being rotatable about said first axis independently of said first shaft;
   a crank arm having one end attached to said second shaft and another end slidably engaged within said groove of said guide piece;
   a second drive unit coupled to said second shaft for effecting rotation thereof; and
   wherein rotation of said second shaft effects reciprocal motion of said carrying bar along said longitudinal axis and rotation of said first shaft effects rotation of said carrying bar about said first axis.

2. A device according to claim 1, wherein said groove is straight.

3. A device according to claim 2, further comprising a pair of guide rods mounted in said housing in parallel, spaced apart relation with said carrying bar, said guide piece being slidably engaged with said guide rods and said carrying bar for guiding reciprocal motion of said carrying bar.

4. A device according to claim 2, further comprising a second carrying bar movably mounted on said housing and attached to said guide piece, a second finger being attached to said second carrying bar.

5. A device according to claim 2, wherein said housing comprises a sidewall, and said carrying bar is mounted so as to extend therethrough.

6. A device according to claim 2, wherein each of said drive units comprises an electro-servo motor.

7. A device according to claim 2, further comprising a first toothed belt gear mechanism coupling said first drive unit to said first shaft and a second toothed belt gear mechanism coupling said second drive unit to said second shaft.

8. A device according to claim 1, further comprising a pair of guide rods mounted in said housing in parallel, spaced apart relation with said carrying bar, said guide piece being slidably engaged with said guide rods and said carrying bar for guiding reciprocal motion of said carrying bar.

9. A device according to claim 8, further comprising a second carrying bar movably mounted on said housing and attached to said guide piece, a second finger being attached to said second carrying bar.

10. A device according to claim 8, wherein said housing comprises a sidewall, and said carrying bar is mounted so as to extend therethrough.

11. A device according to claim 8, wherein each of said drive units comprises an electro-servo motor.

12. A device according to claim 8, further comprising a first toothed belt gear mechanism coupling said first drive unit to said first shaft and a second toothed belt gear mechanism coupling said second drive unit to said second shaft.

13. A device according to claim 1, further comprising a second carrying bar movably mounted on said housing and attached to said guide piece, a second finger being attached to said second carrying bar.

14. A device according to claim 13, further comprising a first toothed belt gear mechanism coupling said first drive unit to said first shaft and a second toothed belt gear mechanism coupling said second drive unit to said second shaft.

15. A device according to claim 13, wherein said housing comprises a sidewall, and said carrying bars are mounted so as to extend therethrough.

16. A device according to claim 13, wherein each of said drive units comprises an electro-servo motor.

17. A device according to claim 1, wherein said housing comprises a sidewall, and said carrying bar is mounted so as to extend therethrough.

18. A device according to claim 17, further comprising a first toothed belt gear mechanism coupling said first drive unit to said first shaft and a second toothed belt gear mechanism coupling said second drive unit to said second shaft.

19. A device according to claim 17, wherein each of said drive units comprises an electro-servo motor.

20. A device according to claim 1, wherein each of said drive units comprises an electro-servo motor.

21. A device according to claim 20, further comprising a first toothed belt gear mechanism coupling said first drive unit to said first shaft and a second toothed belt gear mechanism coupling said second drive unit to said second shaft.

22. A device according to claim 1, further comprising a first toothed belt gear mechanism coupling said first drive unit to said first shaft and a second toothed belt gear mechanism coupling said second drive unit to said second shaft.

23. A device according to claim 22, further comprising:
a mounting plate receiving said first shaft;
a first holding device adjustably mounted on said mounting plate, said first drive unit being mounted on said first holding device;
a second holding device adjustably mounted on said mounting plate, said second drive unit being mounted on said second holding device; and
wherein both said holding devices are movable relatively to said first and second drive units for adjusting tension in said first and second toothed belt gear mechanisms.

* * * * *